June 12, 1962
H. J. LITTLE
3,038,825
LAMINATING BAG
Filed Oct. 21, 1959
3 Sheets-Sheet 1
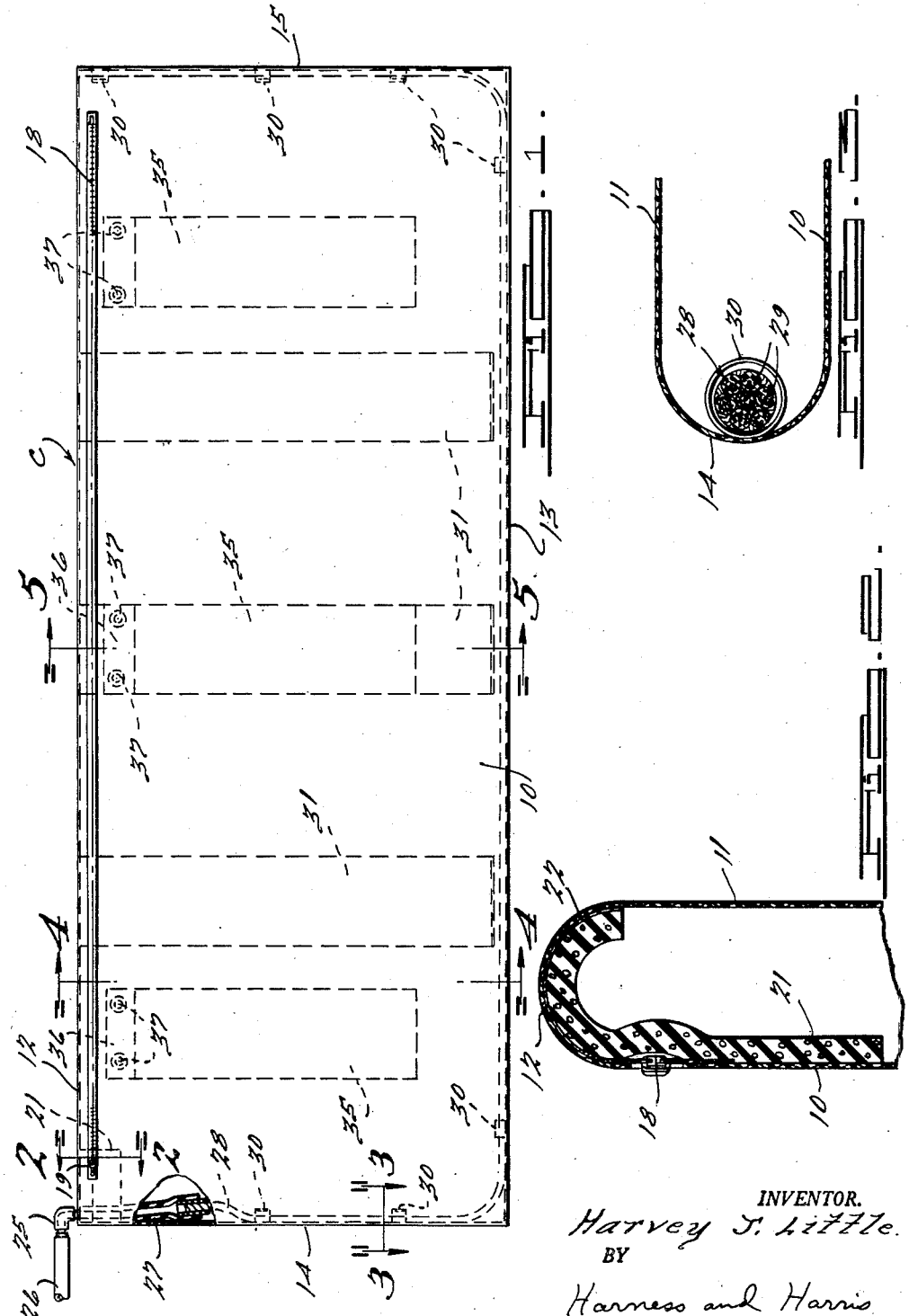
INVENTOR.
Harvey J. Little.
BY
Harness and Harris
ATTORNEYS.

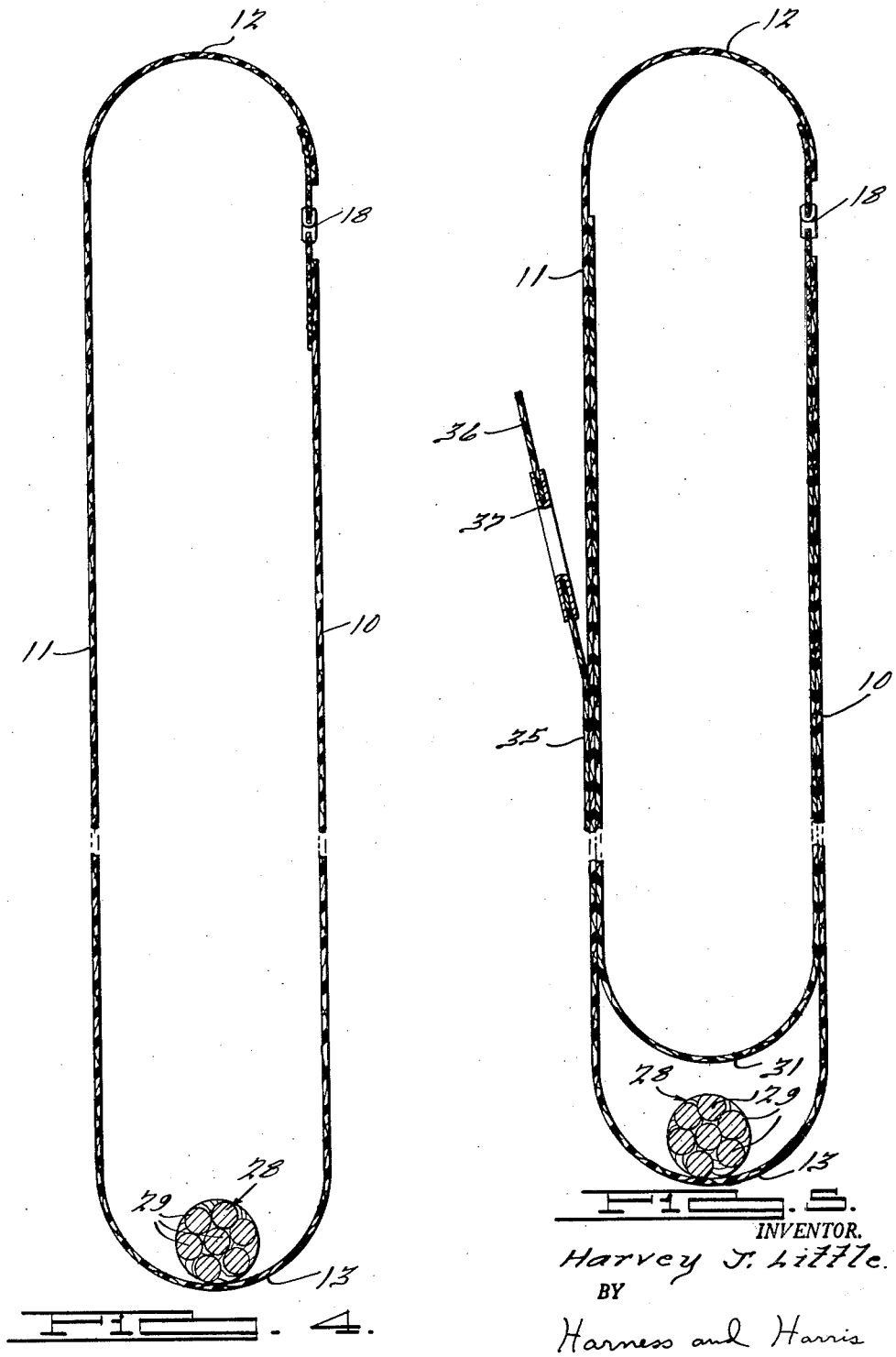

June 12, 1962  H. J. LITTLE  3,038,825
LAMINATING BAG
Filed Oct. 21, 1959  3 Sheets-Sheet 3
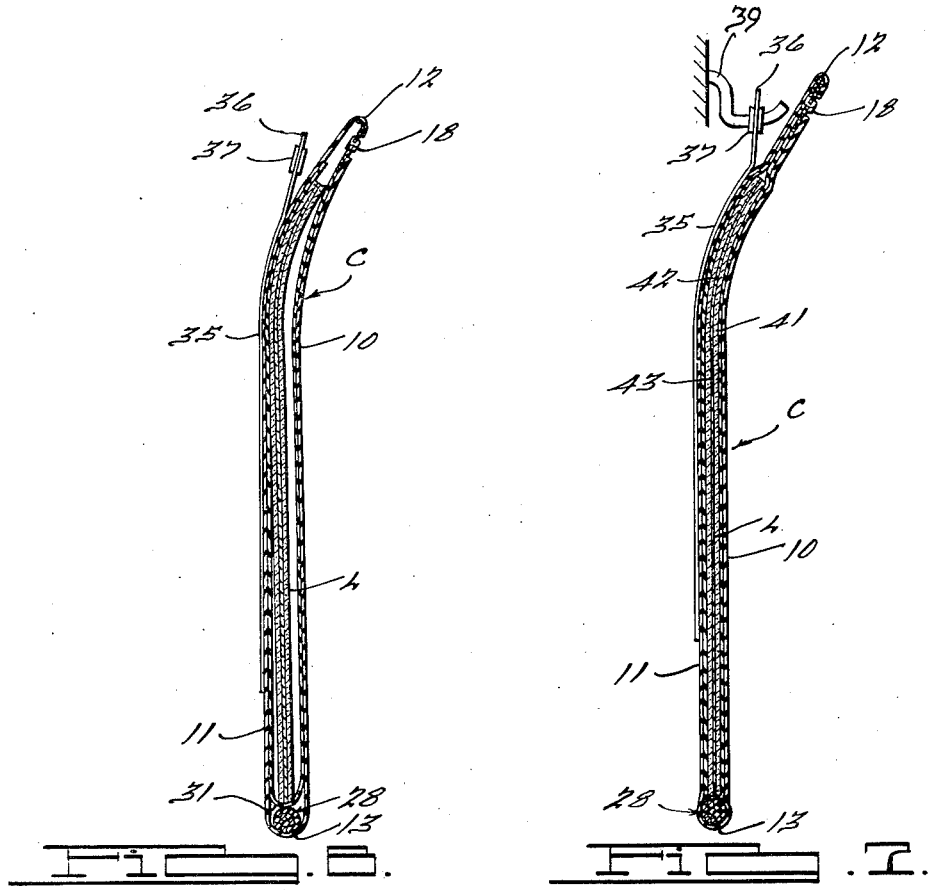
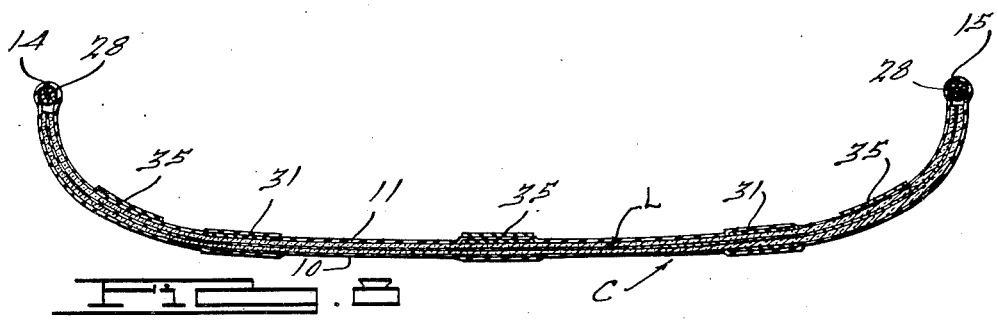
INVENTOR.
Harvey J. Little.
BY
Harness and Harris
ATTORNEYS.

United States Patent Office 3,038,825
Patented June 12, 1962

3,038,825
LAMINATING BAG
Harvey J. Little, Trenton, Mich., assignor to Chrysler Corporation, Highland Park, Mich., a corporation of Delaware
Filed Oct. 21, 1959, Ser. No. 847,793
6 Claims. (Cl. 154—2.7)

This invention relates to a flexible, air impervious, waterproofed bag adapted to receive a multi-layer laminate, such as a windshield glass, during the edge tacking and/or final laminating steps of a laminating process.

It is a primary object of this invention to provide a flexible, air impervious, laminate receiving bag that includes means to facilitate evacuation of air from the bag interior that is arranged in such a manner as to insure complete evacuation of the bag and the spaces between the various layers of the laminate.

It is still another object of this invention to provide a laminate receiving bag having improved means for supporting the laminate within the bag and an improved type of sealing closure for the entrance to the bag interior.

It is still another object of this invention to provide an air impervious, laminate receiving bag that has novel border means to facilitate air evacuation of the bag interior which means will not interfere with the subsequent application of an exterior pressure to the bag to compress the several layers of the laminate during the process that joins the laminate layers as an integral unit.

It is still another object to provide a flexible air impervious, laminate receiving bag adapted to receive a glass panel or the like that has means to provide for the evacuation of air from the bag interior comprising a marginally located rope-like air conduit that has an end portion joined to a valved suction conduit that extends into the bag interior.

It is still another object of this invention to provide a laminate receiving pressure bag with rope-like air conduit means extending about the interior marginal portions of the bag and laminate supporting sling means on the bag interior to support the laminate in a position with edge portions thereof adjacent the rope-like air conduit means.

Other objects and advantages of this invention will be readily apparent from a reading of the following description and a consideration of the related drawings wherein:

FIG. 1 is a top plan elevational view, with portions broken away and shown in section, of a laminate receiving bag embodying this invention;

FIG. 2 is an enlarged fragmentary sectional elevational view through the bag opening closure means, the view being taken along the lines of and in the direction of the arrows 2—2 of FIG. 1;

FIG. 3 is an enlarged fragmentary sectional elevational view along an end border portion of the bag, the view being taken along the lines of and in the direction of the arrows 3—3 of FIG. 1;

FIG. 4 is an enlarged sectional elevational view taken across the width of the laminate receiving bag, the view being taken along the lines of and in the direction of the arrows 4—4 of FIG. 1;

FIG. 5 is an enlarged sectional elevational view taken across the width of the laminate receiving bag, the view being taken along the lines of and in the direction of the arrows 5—5 of FIG. 1;

FIG. 6 is a sectional elevational view, corresponding to FIG. 5, showing a glass laminate inserted in the laminate receiving bag, the view showing the condition prior to evacuation of the bag interior.

FIG. 7 is a sectional elevational view, similar to FIG. 6, showing the relationship of the bag and the contained laminate after evacuation of the air from the interior of the bag; and FIG. 8 is a sectional elevational view taken lengthwise of the bag shown in FIG. 1, the view showing the relationship of the bag portions and the contained laminate when the interior of the bag has been evacuated.

In the process of fabricating laminated safety glass, such as motor vehicle windshields or the like, it has been common practice to place a thin layer of plastic material between a pair of thin glass layers and to then join these superimposed three layers by the application of heat and pressure to the exterior surfaces of the glass outer layers. Flat glass laminates have not presented much of a problem in the manufacturing process. However, with the increase in use of curved glass windshields and windows, particularly glasses that are characterized as having compound curvature, the manufacturing processes to obtain the laminated layers have produced a number of problems that have resulted in increased breakage during the manufacturing processes with the resultant financial loss or increased operating cost. The usual process of laminating any curved glass windshield or window has included the steps of placing the plastic interlayer between the pair of previously bent outer glass layers and then running the assembled sandwich of glass and plastic through a tacking roll or "nipper" roll wherein pressure was applied to the glass outer surfaces primarily around the peripheral portions of the assembled laminate so as to squeeze any entrapped air from between the glass layers and to tack the peripheral portions of the laminate to prevent the introduction of air or liquid between the several layers during the subsequent manufacturing step that bonds the layers into an integral unit. After tacking the edge portions of the laminate the laminated glass unit is usually placed in a heat chamber such as an autoclave unit wherein hot pressurized liquid applies heat and pressure to the external surfaces of the glass laminate to complete the process of bonding the glass and plastic layers into an integral unit. If the peripheral portions of the superimposed layers have not been adequately sealed prior to introduction of the glass laminate into the autoclave unit, then there is the possibility that the liquid of the autoclave unit will be forced between the layers of the laminate to form bubbles or the like and the glass laminate will be ruined for its intended purpose.

While the "nipper" rolls or tacking rolls have been satisfactory for sealing the edge portions of curved glass laminates, still, it requires a high degree of skill on the part of the tacking roll operator to turn out a sufficient number of tacked laminates with a minimum of breakage. The invention herein disclosed eliminates the need for operator skill in tacking glass laminates and increases the number as well as the quality of glass laminates that can be produced by the worker in this part of the glass laminating process. Furthermore, by the use of a laminating bag of the type disclosed, it is possible to not only edge tack, but to completely laminate a glass sandwich while retaining it within the laminating bag and thus isolate the glass laminate from the fluid used to heat and apply pressure to the external surfaces of the glass laminate. This is a manufacturing improvement because it can eliminate certain washing steps that have previously been required in processes wherein the glass laminate is placed in an oil autoclave solution for the final heating and pressurizing process.

The laminating bag or container C shown in FIG. 1 comprises an elongated bag of rubberized cloth or similar air and liquid impervious material that is highly flexible and of sufficient strength to avoid being cut or torn during the steps of inserting and withdrawing glass laminates from the bag interior. The bag C is essentially of rectangular shape and can be considered to contain a top side 10, a bottom side 11, a top edge portion 12 and a bottom edge portion 13. The end edges of the bag have been identified by the reference numerals 14 and 15, respectively. Extending lengthwise of the top side 10 of the bag C, for substantially the full length thereof, is an automatically sealing closure means 18 that can be a so-called zipper fastener. The closure means 18 includes a slidable head 19 that has handle tabs of conventional type to facilitate opening and closing of the fastener 18. As it is essential to obtain a completely sealed bag interior, means have been provided at one end of the closure means 18 to insure a seal proof closure after the closure means 18 has been operated to lock the laminate within the container C. FIGS. 1 and 2 are thought to clearly disclose the improved sealing means associated with the closure means 18. This sealing means comprises a substantially rectangular pad 21 of compressible material such as sponge rubber or the like that is located beneath and connected to the underside of the bag top end 12 by bonding means such as cement or the like which has been denoted 22 (see FIG. 2). The pad 21 is not fixed to the underside of the top portion 10 of bag C so that it will not interfere with the insertion of the glass laminate through the bag opening when the closure means 18 is released. While it is possible to have a sealing pad such as the pad 21 extend the full length of the bag beneath the closure means 18, still, it has been found from experience that the occurrence of leakage along the length of the closure means 18 seems to only be present adjacent the end of the closure means 18 that is finally closed.

One of the prime features of the laminate tacking bag shown in the drawings relates to the means utilized to evacuate air from the interior of the bag. This air evacuation means comprises a nipple connection 25 that has a quick disconnect self sealing valve means (not shown) associated therewith so that the hose element 26 can be readily connected to and detached from the nipple 25. The hose 26 is connected to a suction source so that the interior of the bag C can be evacuated through the nipple 25. Furthermore, when the hose 26 is detached from the nipple 25 the valve means associated with the nipple 25 will automatically seal the interior of the bag C against loss of its vacuum. Connected to the nipple 25 and extending into the interior of the bag C is a hose section 27 (see FIG. 1) that is of some resilient material such as rubber or the like. This hose section 27 provides the suction port through which air within the bag interior may be withdrawn. Mounted in the free end of the hose section 27 is a flexible rope section 28 that may be formed from a plurality of intertwined hemp elements 29 (see FIG. 3). The rope section 28 extends about three sides of the bag interior as clearly shown in FIG. 1. Loop means 30 are spaced along the interior edges of the three sides of the bag C to provide means to retain the rope element 28 in its peripheral position. The prime purpose of the rope element 28 is to provide an air conduit around the bag interior that prevents complete collapse of the bag top and bottom walls 10, 11 when the bag interior is subjected to vacuum. Rope 28 has air channels extending lengthwise thereof because of its intertwined construction that provide a conduit or channel around three sides of the bag through which air may be continuously evacuated from the interior of the bag. Without some interior spacing means, such as the rope element 28, it is possible that the top and bottom walls 10, 11 of the bag C would collapse against each other during an air evacuation process and thereby prevent the complete withdrawal of any air bubbles existing from between the layers of the glass laminate. FIGS. 6 and 7 are thought to show the function of the rope element 28 during an evacuation process as these two figures show the relative positions of the wall portions 10, 11 of the bag both before and after the bag interior has been evacuated.

Another structural feature on bag C that is quite advantageous is the use of spaced slings 31 on the inner sides of the walls 10, 11 of the bag C whereby the glass laminate L may be supported just out of contact with the peripherally positioned rope 28 prior to evacuation of the bag interior. The slings 31 are so positioned that they do not interfere with ready insertion of the glass laminate L into the bag C while at the same time providing a reinforced wall at spaced portions along the length of the bag interior for retention of the glass laminate L. Because of the loops 31 the glass laminate L may be readily dropped into the bag interior through the opening provided by release of the closure means 18 and the lower edges of the glass laminate L will not fall upon the rope element 28 or have a tendency to cut through the bottom edge 13 of the bag.

Because the bag unit C will preferably be supported in a vertical position within a heat chamber (see FIG. 7) during the air evacuation and heating process, bag C is provided with tab means 35 on the outer side of its rear wall 11 which tab means 35 reinforces the back wall 11. The tab means 35 are flexible strips of material bonded or otherwise fixed to the outer side of the back wall 11 of bag C for most of their length. Tabs 35 have a hinged connector portion 36 at their upper ends that is free of the bag and includes grommet means 37. The grommet means 37 are adapted to be inserted on pins or hooks 39 within the air evacuation and heating chamber so as to support the bag C in the intended position during the tacking and/or laminating process in which the bag C is utilized.

The evacuation and heating chamber proposed for use with the bag C could be of the autoclave type shown in U.S. Patent 1,274,206 issued to C. Shuman et al. Preferably the interior of the bag C would be evacuated before or while external heat and pressure in the form of steam, or some other hot fluid, is supplied to the area surrounding the bag. When a predetermined vacuum has been produced within the interior of bag C the suction line to the bag interior may be sealed off and thereafter external heat and pressure continued until the tacking and/or laminating process is completed. In the alternative a continuous suction may be applied during the application of external heat and pressure.

Laminating of a glass and plastic laminate L with a bag unit such as the unit C is a relatively simple and highly efficient operation that substantially eliminates glass breakage during the edge tacking and subsequent laminating process. The previously bent glass layers 41 and 42 with the plastic interlayer 43 are assembled as a sandwich and placed within the bag interior through the opening formed by release of the closure means 18. Some temporary holding means such as masking tape, Scotch tape or the like may be placed at spaced locations around the periphery of the glass laminate L to temporarily hold the glass and plastic sandwich in assembled positions. The closure means 18 is then closed so as to sealingly fasten the bag opening and thereafter the nozzle or nipple 25 is connected to an evacuation hose 26. Prior to connection of the nipple 25 to the evacuation hose 26, the relative position of the bag C and glass laminate L are shown in FIG. 6. After connection of hose 26 to nipple 25, suction is applied to the interior of the bag C through the flexible hose 27 and through the conduit formed around three peripheral sides of the bag interior by virtue of the porous rope element 28 that is positioned along the side and bottom edges of the bag interior. The rope element 28 holds the front and back surfaces 10, 11 of the bag C spaced apart and provides a conduit means through the porous rope as well as through the area immediately adjacent the periphery of the rope so that any air within the bag C may be readily evacuated. As the edge of the glass laminate L, along three sides thereof is positioned immediately adjacent the rope formed conduit, it is thought to be clear that efficient means are provided for evacuating air from between the laminates 41, 42, 43 of the panel L so that there will be no air bubbles trapped between the several laminates during the subsequent pressing operation. At the same time that the interior of the bag C is being evacuated through the conduit 25, 28 heat and pressure are being applied to the exterior surface of the bag C by means of steam, hot oil or water or any other suitable heated fluid arranged in a container in such a manner that substantially equal pressure will be applied to all portions of the exterior surfaces of the bag C. Because the interior of the bag is evacuated at the same time that the pressure along the exterior surfaces of the bag C is increased, an effective compressive force is applied to all of the exterior surfaces of the glass laminate L so that the two glass layers 41, 42 will be pressed against the opposite sides of the plastic interlayer 43 at the time that the interlayer 43 is being heated and thus an effective bond is obtained between the inner surfaces of the glass panels 41, 42 and the adjacent surface of the plastic interlayer 43. FIGS. 7 and 8 are considered to show the relative positions of the bag and laminate portions during the pressing operation just described. The application of heat and external pressure to the outer surface of the bag C can be obtained in a conventional type of autoclave unit wherein the autoclave tank is filled with either steam or some hot liquid to produce the required heat and pressure for the laminating operation.

The peripheral rope member 28 that insures complete evacuation of air from within the glass laminate L and the adjacent interior portions of the bag C is considered to be of prime importance in the operation of the aforedescribed process. The rope 28 not only holds the opposed walls of the container spaced apart during the evacuation process so as to form an air discharge conduit, but in addition the spiral spaces between the intertwined rope elements 29 provide additional interior conduits through the rope 28 that assist in the air evacuation. In addition, the rope 28 provides a bumper element around three sides of the bag C which cooperates with the sling arrangement 35 to prevent damage to the bag during insertion of the glass laminate L into the bag through the opening provided by release of the fastening means 18.

Under certain circumstances it may be advantageous to vary the lengths of the front and back walls 10, 11 of the bag C such that the bag will be formed with a natural curvature approximating the curvature of the bent glass window to be inserted therein as shown in FIG. 8. Under such circumstances the bags are substantially form fitting to the glass laminates that are to be placed therein for the tacking and laminating processes. It is thought to be obvious from the foregoing description that the pressure bag C can be used to both edge tack the preassembled laminate L and to also complete the bonding of the glass layers 41, 42 to the plastic interlayer 43. If sufficient heat and pressure are applied for the requisite time to the interior of the container (not shown) that supports and encloses the pressure bag C, then not only will the air evacuation and edge tacking occur in bag C but in addition the interlayer 43 will be bonded to the glass layers 41, 42 throughout its entire surface area. This accomplishes the complete laminating process while the laminate L is in bag C and materially reduces the required handling of the glass laminate L. Not only will labor costs be reduced but breakage will be practically eliminated.

I claim:

1. A container adapted for laminating sheet-like frangible material comprising a flexible, air impervious bag having an opening therein and closure means to releasably seal said opening, a suction port connected to the bag interior and a flexible, porous, rope-like bumper element extending from said suction port around a major portion of the inner peripheral area of said bag to provide a suction conduit for evacuation of the bag interior that also serves as a cushioning element for the frangible sheet deposited in said bag.

2. A container adapted for laminating sheet-like frangible material comprising a flexible, air impervious bag having an opening therein and closure means to releasably seal said opening, a suction port connected to the bag interior and a flexible, porous, rope-like bumper element extending from said suction port around a major portion of the inner peripheral area of said bag to provide a suction conduit for evacuation of the bag interior that also serves as a cushion element for the frangible sheet deposited in said bag, said rope-like element comprising a plurality of intertwined strands that provide air passages that extend lengthwise of the element.

3. A container adapted for laminating sheet-like frangible material comprising a flexible, air impervious bag having an opening therein and closure means to releasably seal said opening, a suction port connected to the bag interior and a flexible, porous, rope-like bumper element extending from said suction port around a major portion of the inner peripheral area of said bag to provide a suciton conduit for evacuation of the bag interior that also serves as a cushioning element for the frangible sheet deposited in said bag, said rope-like element comprising a plurality of intertwined strands that provide air passages that extend lengthwise of the element, and loop means on the interior peripheral portion of said bag to retain said rope-like element in a peripherally disposed interior position.

4. A container adapted for laminating sheet-like frangible material comprising a flexible, air impervious bag having an opening therein and closure means to releasably seal said opening, a suction port connected to the bag interior and a flexible, porous, rope-like bumper element extending from said suction port around a major portion of the inner peripheral area of said bag to provide a suction conduit for evacuation of the bag interior that also serves as a cushioning element for the frangible sheet deposited in said bag, said rope-like element comprising a plurality of intertwined stands that provide air passages that extend lengthwise of the element, loop means on the interior peripheral portion of said bag to retain said rope-like element in a peripherally disposed interior position, and sling means mounted on the bag and arranged interiorly thereof to support a laminate in out-of-contact relationship with said rope-like element prior to bag evacuation.

5. A container adapted for laminating sheet-like frangible material comprising a flexible, air impervious bag having an opening therein and closure means to releasably seal said opening, a suction port connected to the bag interior and a flexible, porous, rope-like bumper element extending from said suction port around a major portion of the inner peripheral area of said bag to provide a suction conduit for evacuation of the bag interior that also serves as a cushioning element for the frangible sheet deposited in said bag, said closure means including an interiorly disposed compressible pad arranged beneath at least a postion of the opening in said bag and adapted to be pressed into sealing engagement with the adjacent bag interior surfaces when the exterior surfaces of the bag overlying the pad are subjected to an external pressure greater than the pressure within the bag.

6. A container adapted for laminating sheet-like frangible material comprising a flexible, air impervious bag having an opening therein and closure means to releasably seal said opening, a suction port connected to the bag interior and a flexible, porous, rope-like bumper element extending from said suction port around a major portion of the inner peripheral area of said bag to provide a suction conduit for evacuation of the bag interior that also serves as a cushioning element for the frangible sheet deposited in said bag, said rope-like element comprising a plurality of intertwined strands forming undulating exterior surface portions that provide air passages that extend lengthwise of the element, loop means on the interior peripheral portion of said bag to retain said rope-like element in a peripherally disposed interior position, sling means mounted on the bag and arranged interiorly thereof to support a laminate in out-of-contact relationship with said rope-like element, and bag supporting tab means mounted on the exterior of said bag.

References Cited in the file of this patent

UNITED STATES PATENTS

| | | |
|---|---|---|
| 1,914,392 | Worrall | June 20, 1933 |
| 2,308,453 | Potchen et al. | Jan. 12, 1943 |